US012710770B2

(12) United States Patent
Geng et al.

(10) Patent No.: US 12,710,770 B2
(45) Date of Patent: Aug. 18, 2026

(54) INTELLIGENT SECURITY METHOD, SYSTEM, AND STORAGE MEDIUM BASED ON QUADRUPED ROBOT

(71) Applicant: IXOVA INC, Dover, DE (US)

(72) Inventors: Kangming Geng, Hong Kong (HK); Angela Yijia Geng, Los Angeles, CA (US)

(73) Assignee: IXOVA INC, Dover, DE (US)

( * ) Notice: Subject to any disclaimer, the term of this patent is extended or adjusted under 35 U.S.C. 154(b) by 0 days.

(21) Appl. No.: 19/342,656

(22) Filed: Sep. 28, 2025

(65) Prior Publication Data

US 2026/0029803 A1 Jan. 29, 2026

Related U.S. Application Data

(63) Continuation of application No. 19/283,265, filed on Jul. 29, 2025, now abandoned.

(51) Int. Cl.
*G05D 1/683* (2024.01)
*B60Q 1/24* (2006.01)
(Continued)

(52) U.S. Cl.
CPC ............. *G05D 1/683* (2024.01); *B60Q 1/249* (2022.05); *G05D 1/622* (2024.01); *G05D 1/689* (2024.01);
(Continued)

(58) Field of Classification Search
CPC ........ G05D 1/683; G05D 1/622; G05D 1/689; G05D 2101/22; G05D 2105/85;
(Continued)

(56) References Cited

U.S. PATENT DOCUMENTS 9,641,763 B2 * 5/2017 Bernal ............. G08B 13/19645
12,099,357 B1 * 9/2024 Ebrahimi Afrouzi ........................ G05D 1/0214
(Continued)

FOREIGN PATENT DOCUMENTS

CN 112907625 A * 6/2021 ............. G06N 3/045
CN 115356743 A * 11/2022 ............. G01S 17/89
(Continued)

OTHER PUBLICATIONS

Machine Translation: CN-119169759-A (Year: 2024).*
(Continued)

*Primary Examiner* — Anne Marie Antonucci
*Assistant Examiner* — Connor L Knight

(57) ABSTRACT

An intelligent security method, system, and storage medium based on a quadruped robot are provided. The method includes receiving first coordinates corresponding to a target object and formulating a navigation path; dynamically correcting the navigation path during movement; when a distance between the quadruped robot and the target object reaches a preset tracking threshold, activating a surveillance camera and capturing a contour image of the target object; calculating a similarity between the contour image and a preset reference image; when the similarity is less than the preset value, initiating an attack and/or an alarm action, and calculating second coordinates; updating the navigation path and continuously tracking. Problems of limited surveillance coverage of traditional systems, inability to actively track moving targets, and untimely response to unexpected targets are solved.

9 Claims, 3 Drawing Sheets

(51) Int. Cl.

| | |
|---|---|
| ***G05D 1/622*** | (2024.01) |
| ***G05D 1/689*** | (2024.01) |
| ***G05D 101/00*** | (2024.01) |
| ***G05D 105/85*** | (2024.01) |
| ***G05D 109/12*** | (2024.01) |
| ***G06T 7/246*** | (2017.01) |
| ***G06T 7/73*** | (2017.01) |

(52) U.S. Cl.
CPC ................ *G06T 7/248* (2017.01); *G06T 7/74* (2017.01); *G05D 2101/22* (2024.01); *G05D 2105/85* (2024.01); *G05D 2109/12* (2024.01); *G06T 2207/10016* (2013.01); *G06T 2207/30232* (2013.01); *G06T 2207/30241* (2013.01); *G06T 2207/30261* (2013.01)

(58) Field of Classification Search
CPC ........ G05D 2109/12; G05D 1/02; G05D 1/10; B60Q 1/249; G06T 7/248; G06T 7/74; G06T 2207/10016; G06T 2207/30232; G06T 2207/30241; G06T 2207/30261; G06T 7/00; B62D 57/024; B62K 11/00; G08B 13/196; B25J 9/16; G06V 10/82; G06V 10/762; G06V 20/56
See application file for complete search history.

(56) References Cited

U.S. PATENT DOCUMENTS

| | | | | |
|---|---|---|---|---|
| 12,158,763 | B2 * | 12/2024 | Ouellette | G05D 1/0274 |
| 2016/0176348 | A1 * | 6/2016 | Vaghefinazari | H04N 23/61 348/148 |
| 2018/0329392 | A1 * | 11/2018 | Li | G06V 20/40 |
| 2019/0213309 | A1 * | 7/2019 | Morestin | G01S 17/04 |
| 2019/0248014 | A1 * | 8/2019 | Deyle | B25J 13/006 |
| 2022/0283590 | A1 * | 9/2022 | Deyle | G05D 1/0246 |

FOREIGN PATENT DOCUMENTS

| | | | | |
|---|---|---|---|---|
| CN | 116563986 | A * | 8/2023 | G07C 9/25 |
| CN | 119169759 | A * | 12/2024 | G06N 3/0464 |
| WO | WO-2021216831 | A1 * | 10/2021 | B25J 9/1697 |

OTHER PUBLICATIONS

Machine Translation: CN-116563986-A (Year: 2023).*
Machine Translation: CN-115356743-A (Year: 2022).*
Machine Translation: CN-112907625-A (Year: 2021).*

* cited by examiner

INTELLIGENT SECURITY METHOD, SYSTEM, AND STORAGE MEDIUM BASED ON QUADRUPED ROBOT

CROSS REFERENCE TO RELATED APPLICATIONS

This application is a continuation application of U.S. application Ser. No. 19/283,265, filed on Jul. 29, 2025. The contents of the above-identified application are incorporated herein by reference.

FIELD OF THE INVENTION

The present invention relates to the field of intelligent security technology, and particularly to an intelligent security method, system, and storage medium based on a quadruped robot.

BACKGROUND OF THE INVENTION

Intelligent security systems play an increasingly important role in modern society and are widely used in various scenarios such as homes, businesses, and industries, for providing security monitoring, intrusion detection, and early warning functions. With the continuous development of artificial intelligence and robotics technology, the application of intelligent robots in the field of security, especially the use of mobility and adaptability of quadruped robots, has become an important direction in current technological development. This combination helps to enhance the coverage and response capabilities of security systems.

Existing intelligent security systems usually rely on fixed security cameras for surveillance. These cameras transmit video streams to a server, which detects abnormalities or living beings in the target area through image analysis technology. If a potential threat is detected, the system may trigger an alarm or notify security person. In some systems, movement mechanisms may also be incorporated, but these mechanisms usually have limited moving functions, making it difficult to achieve flexible tracking and disposal of target objects.

Moreover, existing security systems based on fixed security cameras have the problem of limited surveillance range and the possibility of blind spots. Once the target object moves into the blind area of the camera, it will no longer be able to continue tracking and monitoring.

SUMMARY OF THE INVENTION

The purpose of the present invention is to provide an intelligent security method, system, and storage medium based on a quadruped robot that have the ability to dynamically track and respond to target objects.

In order to achieve the purpose mentioned above, the present invention provides an intelligent security method based on a quadruped robot including the following steps:

receiving, by a quadruped robot located in a surveillance area, first coordinates corresponding to a target object, formulating a navigation path based on the first coordinates, and moving toward the target object along the navigation path;

dynamically correcting the navigation path during movement of the quadruped robot according to the first coordinates received in real time;

when a distance between the quadruped robot and the target object reaches a preset tracking threshold, activating a surveillance camera mounted on the quadruped robot and capturing a contour image of the target object based on the surveillance camera;

calculating a similarity between the contour image and a preset reference image;

when the similarity is greater than or equal to a preset value, stopping tracking and returning to a waiting point;

when the similarity is less than the preset value, initiating an attack and/or an alarm action, and calculating second coordinates of the target object based on the contour image;

updating the navigation path based on the second coordinates and continuously tracking the target object; and iteratively optimizing the second coordinates during tracking by periodically acquiring the contour image.

As a preferable embodiment, the first coordinates are generated by:

arranging a plurality of security cameras at intervals in the surveillance area;

receiving, by a server, video streams captured by the security cameras in real time;

performing, by the server, image detection processing on the video streams; when a moving target object is detected, generating first coordinates corresponding to the target object and transmitting the first coordinates to the quadruped robot in a standby state.

As a preferable embodiment, when the similarity is greater than or equal to the preset value, the quadruped robot returns first information to the server, and the server suspends processing of the video streams for a preset period based on the first information; when the similarity is less than the preset value, the quadruped robot feeds back second information to the server and transmits the second coordinates corresponding to the target object to the server in real time.

As a preferable embodiment, the server sends a notification message to a mobile terminal based on the second information.

As a preferable embodiment, when the similarity is less than the preset value, the quadruped robot further transmits the contour image to the server, and the server tracks a position of the target object in the video streams based on the contour image and generates third coordinates according to the position; when the quadruped robot loses the target object, the server transmits the third coordinates to the quadruped robot, and the quadruped robot updates the navigation path based on the third coordinates and moves accordingly.

As a preferable embodiment, the server further predicts a movement trajectory of the target object based on the second coordinates to generate a target position of the target object at a next moment and generates fourth coordinates according to the target position. When both the quadruped robot and the security cameras simultaneously lose the target object, the server transmits the fourth coordinates to the quadruped robot, and the quadruped robot updates the navigation path based on the fourth coordinates and moves accordingly.

As a preferable embodiment, during movement of the quadruped robot, environmental sensors equipped in the quadruped robot detects the surrounding environment in real time, and when an obstacle is detected, the quadruped robot adjusts the navigation path based on position coordinates of the obstacle to avoid the obstacle.

As a preferable embodiment, the quadruped robot is further equipped with a light sensor and a light assistance system, when the light sensor detects that a current ambient brightness is below a first preset value, the light assistance system activates a fill light; when the light sensor detects that the current ambient brightness exceeds a second preset value, the light assistance system activates a light filter device to cover the surveillance camera.

The present invention further provides an intelligent security system based on a quadruped robot, which includes a quadruped robot operating according to the mentioned-above intelligent security method.

The present invention further provides computer-readable storage medium, comprising a computer program executable by a processor to implement the mentioned-above intelligent security method.

Compared with existing technologies, the intelligent security method provided by the present invention allows the quadruped robot to autonomously plan navigation paths, dynamically correct the navigation paths, identify targets, and continuously track based on the initial coordinates provided externally and real-time images captured by its own. In such a way, the problems of limited surveillance coverage of traditional systems, inability to actively track moving targets, and untimely response to unexpected targets are solved, thereby improving the intelligence level and response capability of security systems.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

To elaborate on the technical content, structural features, objectives, and effects of the present invention, the following detailed explanation is provided in conjunction with the implementation methods and accompanying drawings.

Figure 1:
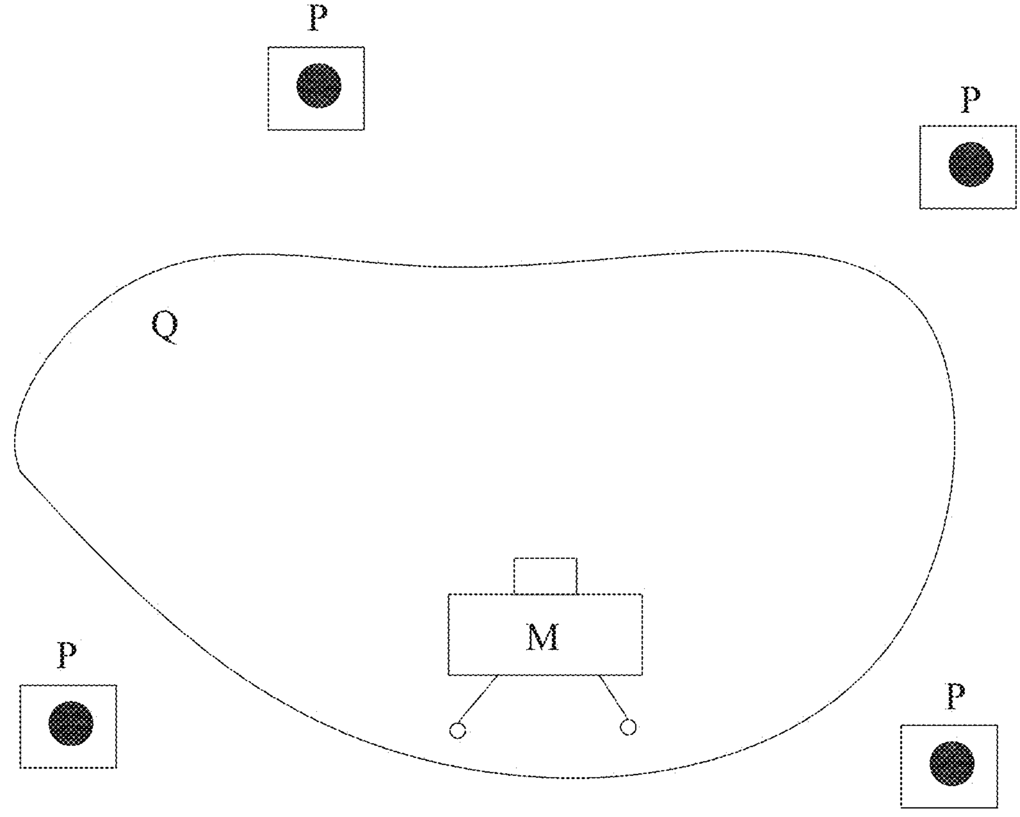
FIG. 1 is a layout diagram of the intelligent security system according to an embodiment of the present invention.

The present invention discloses an intelligent security method and system based on a quadruped robot, for unmanned intelligent monitoring of a surveillance area Q (such as residential areas, commercial buildings, industrial facilities, and other security-sensitive zones), as shown in FIG. 1.

Figure 2:
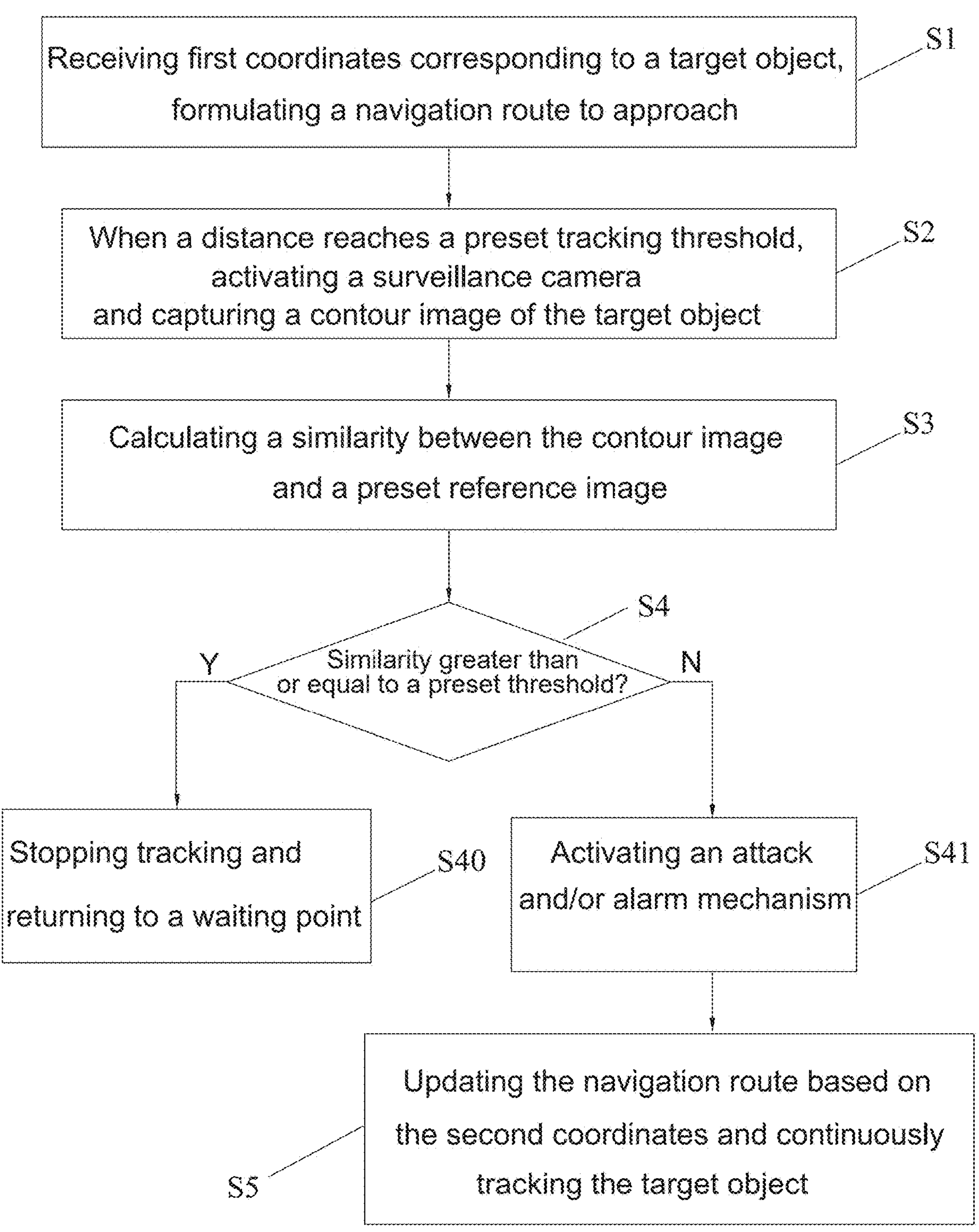
FIG. 2 is a flowchart of the intelligent security method according to an embodiment of the present invention.

Referring to FIGS. 1 and 2, the intelligent security method includes the following steps:

S1, receiving, by a quadruped robot M located in a surveillance area Q, first coordinates corresponding to a target object, formulating a navigation path to approach the target object based on the first coordinates, and moving toward the target object along the navigation path.

Since the target object is usually in real-time motion, the quadruped robot M continuously receives the latest first coordinates during its movement and dynamically corrects the navigation path based on the real-time first coordinates received.

S2, when a distance between the quadruped robot M and the target object reaches a preset tracking threshold, activating a surveillance camera mounted on the quadruped robot and capturing a contour image of the target object based on the surveillance camera S3, calculating a similarity between the contour image and a preset reference image.

It should be noted that the reference image here can be an image of a person or other living being that the user has preset to be allowed to enter the surveillance area Q.

S4, judging whether the similarity is greater than or equal to a preset threshold, if yes, it indicates that the current target object is an authorized person or a living being allowed to enter the surveillance area Q, then proceed to S40; if not, it indicates that the current target object has an unauthorized identity, then proceed to S41.

S40, stopping tracking and returning to a waiting point, to wait for the next tracking task.

S41, activating an attack and/or alarm mechanism configured on the quadruped robot M to initiate an attack and/or an alarm action.

It should be noted that appropriate attack mechanisms can be chosen according to security needs, such as electric shock devices, spraying devices (e.g., pepper spray, dye), capture nets, etc. The alarm mechanism can include sound and light alarms, voice broadcasters, etc.

S5, once the current target object is confirmed as an unauthorized identity, updating the navigation path based on the second coordinates and continuously tracking the target object.

During the tracking process, the quadruped robot M iteratively can optimize the second coordinates by periodically obtaining the contour image, thereby achieving close-range precise tracking of the target object.

The intelligent security method disclosed in this embodiment aims to address the issues of limited surveillance range, potential blind spots, and the inability to flexibly track and deal with target objects in existing security systems based on fixed cameras.

Specifically, after the quadruped robot M receives the first coordinates of the target object, an initial navigation path from the current position to the target position is planned based on a navigation algorithm, and the quadruped robot M moves along this path using its movement mechanism (e.g., feet or wheeled chassis). During the movement, if updated first coordinates are received, the quadruped robot M can dynamically correct the navigation path in real time by running a path re-planning algorithm to ensure that it always moves towards the target object.

When the distance between the quadruped robot M and the target object reaches a preset tracking threshold, the surveillance camera integrated in the quadruped robot M is activated to capture the real-time contour image of the target object.

After receiving the contour image, the processing system of the quadruped robot M compares the contour image with a preset reference image (e.g., images of authorized person, or specific vehicles) through image processing and feature matching to calculate their similarity.

If the similarity reaches or exceeds the preset threshold, the target object is identified as a non-threatening entity. The quadruped robot M then terminates the current tracking task and returns to the preset waiting point to enter a standby state.

If the similarity is below the preset threshold, the target object is identified as a potential threat. The processing system of the quadruped robot M will immediately activate the attack/alarm mechanism, such as emitting alarm sounds, flashing lights, or taking other non-lethal intervention measures. Meanwhile, based on the contour image obtained by the surveillance camera, the processing system of the quadruped robot M calculates a second coordinates of the target object relative to the quadruped robot M through a visual positioning algorithm.

Based on this more precise second coordinates, the navigation path will be updated by the navigation module of the quadruped robot M, so that the quadruped robot M can continuously and closely track the target object.

During the continuous tracking process of the quadruped robot M, new contour images of the target object will be periodically captured, and the second coordinates will be iteratively optimized based on the contour images. For example, filtering algorithms are used to remove noise and improve the accuracy of target position estimation, thus it ensures that the navigation path is updated more accurately, allowing the quadruped robot M to stably follow the moving target object.

In such a way, the quadruped robot M conducts an entire process of intelligent security monitoring: receiving the initial position→navigating to approach→visual recognition→action judgment→visual positioning→continuous tracking and optimization. This enables the quadruped robot M to autonomously move, perceive, make decisions, and execute tasks in performing security tasks.

In this embodiment, the quadruped robot M, as the core execution entity, integrates multiple components to implement the aforementioned method. Specifically, the quadruped robot M includes a movement mechanism, a wireless communication module, a navigation module, a surveillance camera, a processing system, an attack mechanism, and an alarm mechanism.

The wireless communication module is responsible for receiving the first coordinates corresponding to the target object sent from an external source (e.g., a server).

The navigation module is electrically connected to the communication module and the movement mechanism of the quadruped robot M. The navigation module includes a path planning processor and a path memory. The path planning processor is configured to calculate and store the navigation path based on the first or second coordinates. During the movement of the quadruped robot M, and the path planning processor is configured to dynamically correct the navigation path based on the first or second coordinates through a path re-planning algorithm.

The processing system is configured inside the quadruped robot M and is electrically connected to the communication module, the navigation module, the surveillance camera, the attack mechanism, and the alarm mechanism. The processing system is the intelligent core of the entire quadruped robot M and includes an image processing module and a coordinate calculation module. The image processing module is configured to extract features from the captured contour image, and compare with the preset reference image to calculate the similarity. The coordinate calculation module is configured to calculate the second coordinates of the target object by using visual positioning algorithms based on the contour image, and iteratively optimize the second coordinates during continuous tracking by using filtering algorithms.

By utilizing the above intelligent security method, the flexibility and coverage of the security system are significantly enhanced, thereby overcoming the blind spot issue of traditional fixed camera systems. The quadruped robot M can actively approach and track the target object, achieving comprehensive dynamic coverage of the surveillance area Q.

The present invention also can dynamically correct the navigation path, and continuously track the target object based on visual positioning, ensuring that the quadruped robot M can stably and accurately follow the target object, even if the movement trajectory of the target object is changed.

The quadruped robot M is equipped with the surveillance camera, which can autonomously recognize the target object, distinguish the potential threats and non-threatening entities, avoid false alarms, and improve security efficiency.

In the above method, similarity judgment and corresponding actions (terminating tracking or activating the attack/alarm mechanism) are included, thus the quadruped robot M has intelligent decision-making capabilities, allowing it to take appropriate response measures based on the recognition results, thereby enhancing the efficiency and safety of handling.

Moreover, by periodically acquiring contour images and iteratively optimizing the second coordinates, the accuracy and robustness of tracking are improved. This method integrates mobile robots, computer vision, and intelligent control technologies to build an active, intelligent, and efficient security solution.

In the above embodiments, the quadruped robot M can adopt platforms of different sizes and load capacities to meet the needs of different security environments and task requirements.

For example, the wireless communication interface of the wireless communication module can use various wireless communication technologies such as Wi-Fi, 4G/5G, UWB to ensure the reliable communication with external systems (such as servers) at different distances and environments.

The path planning algorithm in the navigation module can employ classic or advanced path planning algorithms such as rapidly-exploring random tree (RRT). The path memory can be a flash memory, an SD card, or other non-volatile storage media. The path re-planning and updating algorithms can be based on Kalman filtering, particle filtering, or other state estimation methods, in conjunction with real-time sensor data.

The tracking threshold can be adjusted according to the needs of the actual application scenario, for example, set between 1 meter and 5 meters.

The surveillance camera can be a visible light camera, an infrared camera, or a thermal imaging camera to capture the target object under different lighting and environmental conditions.

The image processing module calculating the similarity may use feature extraction algorithms such as SIFT, SURF, ORB, or adopt image recognition models based on deep learning.

The preset reference image can be stored on the quadruped robot M or obtained from an external source through the communication module. The preset threshold can be set according to the required recognition accuracy, for example, set between 0.7 and 0.9.

The visual positioning algorithm can use monocular vision, binocular vision, visual-inertial odometry (VIO), or visual SLAM algorithms. The filtering algorithm can be Kalman filtering, extended Kalman filtering (EKF), unscented Kalman filtering (UKF), or particle filtering.

Figure 3:
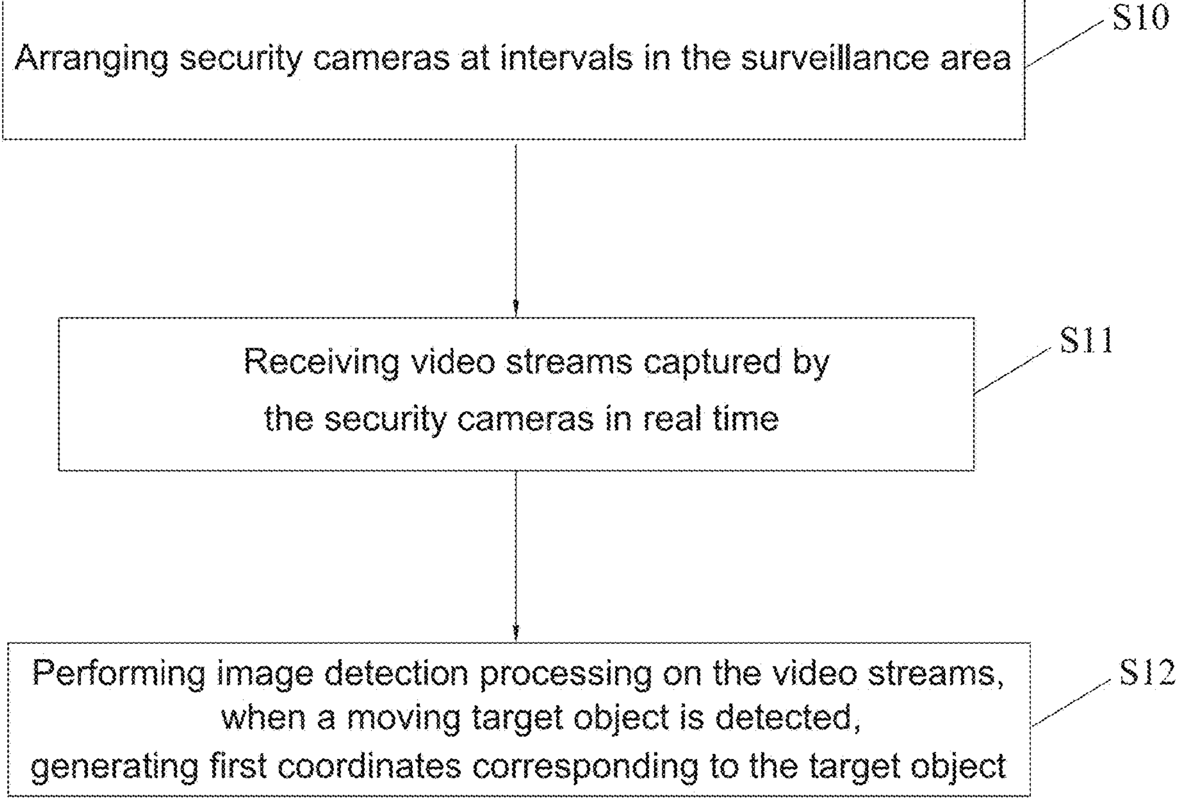
FIG. 3 is a flowchart of the acquisition of the first coordinates according to an embodiment of the present invention.

On the other hand, as shown in FIGS. 1 and 3, the method for generating the first coordinates includes:

S10, arranging a plurality of security cameras P at intervals in the surveillance area Q;

S11, receiving, by a server, video streams captured by the security cameras P in real time;

S12, performing, by the server, image detection processing on the video streams; when a moving target object is detected, generating first coordinates corresponding to the target object and transmitting the first coordinates to the quadruped robot M in a standby state.

In this embodiment, multiple fixed security cameras P (with resolution 1920×1080, frame rate 30 fps) are arranged at different locations in the surveillance area Q at intervals to cover key locations such as entrances and exits, corridors, etc., and are connected to the server through an encrypted network.

After receiving the camera video streams, the server performs background subtraction to detect the moving target objects, classifies them as people, animals, or vehicles, etc., and generates the first coordinates (including timestamps and target types) in a standardized coordinate system.

The coordinates are sent to the standby quadruped robot M through an encrypted wireless network, for triggering the quadruped robot M to activate the tracking.

The quadruped robot M, as a mobile execution unit, receives the server's command, autonomously navigates to the target area, and uses its own sensors for close-range tracking, recognition, and intervention.

On the other hand, when the similarity is greater than or equal to the preset value, the quadruped robot M sends first information to the server, and the server stops processing the video streams for a preset period of time (such as 30 seconds, one minute, three minutes, etc.) based on the first information.

When the similarity is less than the preset value, the quadruped robot M sends second information to the server and transmits the second coordinates corresponding to the target object to the server in real time.

In this embodiment, when the server receives the first information, it indicates that an authorized person has entered the current surveillance area Q, and the current surveillance area Q is safe. The processing of the video streams can be temporarily stopped, which can save the energy of the processor and avoid frequent scheduling of the quadruped robot M.

When the server receives the second information, it indicates that an unauthorized person has entered the current surveillance area Q. The server records this information and stores the second coordinates of the target object for later reference.

Furthermore, the server sends a notification message to a mobile terminal based on the second information.

In this embodiment, users can remotely receive the notification message through the mobile terminal and quickly arrive at the scene to avoid unnecessary losses.

On the other hand, when the similarity is less than the preset value, the quadruped robot M also sends the contour image of the target object, which is currently judged to be an unauthorized person, to the server. The server tracks and searches for the location of the target object in the video streams based on the contour image, and generates third coordinates according to this location.

When the quadruped robot M loses the target object, the server sends the third coordinates to the quadruped robot M, and the quadruped robot M updates the navigation path based on the third coordinates and moves.

The third coordinates generated can be pixel coordinates in the image coordinate system of the security camera P, or coordinates in the global or local coordinate system after coordinate transformation.

In this embodiment, the quadruped robot M may temporarily lose the target during the tracking process due to environmental occlusion, rapid movement of the target object, or sensor failure. Thus the server needs to use the video streams provided by the security camera P to relocate the target and assist the quadruped robot M in resuming tracking.

In this case, the last contour image captured by the quadruped robot M before the target is lost is sent to the server, which contains the visual features of the target object. Then, the server searches for the most similar area to the contour image in the video streams provided by the security camera P to determine the location of the target object in the video frames. The location of the target object is determined by extracting keypoints and descriptors from the contour image and video frames to find matching feature pairs based on feature matching algorithms (such as SIFT, SURF, ORB), which has a certain robustness to target deformation and viewpoint changes.

Specifically, based on the correlation filtering algorithms (such as MOSSE, KCF), the server takes the contour image as a template and calculate the correlation response map in the video frame. The position of the response peak is the target location, which has high computational efficiency and is suitable for real-time tracking. By using these algorithms, the server can quickly use the data in the security camera P for backup tracking when the quadruped robot M loses the target, generating the location information (that is, the third coordinates) of the target object in the field of view of the security camera P.

After searching for the target object based on the third coordinates, the quadruped robot M regenerates the second coordinates and updates the corresponding navigation path based on the contour image captured by the surveillance camera.

Furthermore, the server also predicts the movement trajectory of the target object based on the second coordinates to generate the target position of the target object at the next moment and generates fourth coordinates based on this target position.

When both the quadruped robot M and the security camera P lose the target object at the same time, the server sends the fourth coordinates to the quadruped robot M, so that the quadruped robot M updates the navigation path and moves based on the fourth coordinates.

In extreme cases, when both the quadruped robot M and the security camera P temporarily lose the target, the trajectory prediction module in the server receives the second coordinates (and possibly the third coordinates from the video tracking module) continuously sent by the quadruped robot M during the tracking process. These data constitute the historical movement trajectory of the target object. Then, based on Kalman filtering or machine learning models, the movement trajectory of the target object can be predicted.

Kalman filtering is a commonly used state estimation algorithm that can fuse noisy measurement data to optimally estimate and predict the state of a dynamic system (such as position, velocity), which is suitable for predicting the trajectory of targets with approximately linear motion.

Machine learning models (such as recurrent neural networks RNN, long short-term memory networks LSTM) can learn a large number of target movement patterns to establish more complex non-linear prediction models, which are suitable for predicting the trajectories of targets with complex, non-linear, or environmentally affected motions.

By using these prediction algorithms, the server can generate a predicted target position (that is, the fourth coordinates) when the target is lost, thereby providing a search direction for the quadruped robot M.

The generated fourth coordinates can be a single predicted future position point or a predicted trajectory segment for a future period of time. The server can visualize the prediction results on the monitoring interface to assist operators in making judgments and scheduling.

On the other hand, during the movement of the quadruped robot M, the surrounding environment is detected in real-time by the environmental sensors configured in the quadruped robot M. When an obstacle is detected, the quadruped robot M fine-tunes the navigation path based on the position coordinates of the obstacle to avoid the obstacle.

In this embodiment, the problem of obstacles that the quadruped robot M may encounter during navigation and movement is further solved. Mobile robots in existing technologies often stall or collide due to obstacles, affecting the continuity and reliability of task execution. The present invention, by equipping the quadruped robot M with environmental perception capabilities, enables it to perceive the surrounding environment in real time during movement. Once an obstacle is detected, it can promptly perform obstacle avoidance processing to ensure that the quadruped robot M can safely and smoothly reach the target position or continue tracking the target.

When the quadruped robot M moves along the initial or updated navigation path, the equipped environmental sensors (such as LiDAR, ultrasonic sensors, or depth cameras) continuously scan the direction of movement and the surrounding areas of the quadruped robot M. When the sensor data indicates the presence of obstacles ahead or on the path, a local path planning algorithm is activated. This algorithm uses the obstacle position coordinates information provided by the sensors, combined with the current position and posture of the quadruped robot M, to calculate new path points or path segments to bypass the obstacle. These new path points are then used to update the current navigation path.

According to the updated navigation path, the movement mechanism of the quadruped robot M can adjust or re-plan the movement, thereby avoiding the obstacle and continuing to move towards the target object. The entire process is real-time, ensuring that the quadruped robot M has good adaptability and autonomy in a dynamic environment.

Furthermore, the quadruped robot M is also equipped with a light sensor and a light-assisted processing system. When the light sensor detects that the current ambient light intensity is lower than the first preset value, the light-assisted processing system activates the supplementary light. When the light sensor detects that the current ambient light intensity is greater than the second preset value, the light-assisted processing system activates the light filtering device to cover the surveillance camera.

Stable and clear imaging of the surveillance camera in various lighting conditions is crucial for subsequent image processing tasks (such as target recognition and tracking). Changes in ambient lighting, from bright daylight to dim night, or switching between indoor and outdoor environments, can affect the quality of the images captured by the camera.

The embodiment is based on the principles of photoelectric conversion and imaging optics. The light sensor can convert the received light signal into an electrical signal to measure the ambient light intensity. The supplementary light provides an additional light source to increase the brightness of the scene when the lighting is insufficient.

The light filtering device is used to reduce the amount of light entering the camera lens or filter out unwanted spectral components when the lighting is too strong, to prevent image overexposure or improve contrast. These components work together to intelligently adjust according to real-time lighting conditions, ensuring that the surveillance camera always operates in the optimal imaging state.

In another preferred embodiment of the present invention, an intelligent security system based on the quadruped robot M is also disclosed, which includes the quadruped robot M that operates according to the intelligent security method described in the above embodiment.

The present invention further discloses another intelligent security system, which includes one or more processors, a memory, and one or more programs. One or more programs are stored in the memory and are configured to be executed by one or more processors. The program includes instructions for performing the intelligent security method described above. The processor can be a general-purpose central processing unit (CPU), a microprocessor, an application-specific integrated circuit (ASIC), or one or more integrated circuits, used to execute related programs to implement the functions required by the modules in the intelligent security system according to the present application, or to execute the intelligent security method according to the present application.

The present invention further discloses a computer-readable storage medium, which includes a computer program that can be executed by a processor to complete the intelligent security method described above. The computer-readable storage medium can be any available medium that a computer can access, or a data storage device integrated with one or more available media such as a server, data center, etc. The available medium can be read-only memory (ROM), random access memory (RAM), magnetic media, such as floppy disks, hard disks, magnetic tapes, magnetic discs, or optical media, such as digital versatile discs (DVDs), or semiconductor media, such as solid-state disks (SSDs), etc.

The present invention further discloses a computer program product or a computer program, which includes computer instructions stored in a computer-readable storage medium. The processor of an electronic device reads the computer instructions from the computer-readable storage medium, and the processor executes the computer instructions, causing the electronic device to perform the above-mentioned intelligent security method.

The above disclosure is only preferred embodiments of the present invention and cannot be used to limit the scope of rights of the present invention. Therefore, any equivalent changes made in accordance with the claims of the present invention are within the scope of the present invention.

What is claimed is:

1. An intelligent security method based on a quadruped robot, comprising:

receiving, by a quadruped robot located in a surveillance area and being on standby at a waiting point, first coordinates corresponding to a target object, formulating a navigation path based on the first coordinates, and moving toward the target object along the navigation path;

dynamically correcting the navigation path during movement of the quadruped robot according to the first coordinates received in real time;

when a distance between the quadruped robot and the target object reaches a preset tracking threshold, activating a surveillance camera mounted on the quadruped robot and capturing a contour image of the target object based on the surveillance camera;

calculating a similarity between the contour image and a preset reference image;

when the similarity is greater than or equal to a preset value, stopping tracking and returning to the waiting point;

when the similarity is less than the preset value, initiating an attack and/or an alarm action, and calculating second coordinates of the target object based on the contour image;

updating the navigation path based on the second coordinates and continuously tracking the target object; and iteratively optimizing the second coordinates during tracking by periodically acquiring the contour image;

further comprising:

receiving, by a server, video streams captured by the security cameras in real time;

wherein when the similarity is less than the preset value, the quadruped robot further transmits the contour image to the server, and the server tracks a position of the target object in the video streams based on the contour image and generates third coordinates according to the position; and when the quadruped robot loses the target object, the server transmits the third coordinates to the quadruped robot, and the quadruped robot updates the navigation path based on the third coordinates and moves accordingly.

2. The intelligent security method according to claim 1, wherein the first coordinates are generated by:

arranging a plurality of security cameras at intervals in the surveillance area;

performing, by the server, image detection processing on the video streams;

when a moving target object is detected, generating first coordinates corresponding to the target object and transmitting the first coordinates to the quadruped robot in a standby state.

3. The intelligent security method according to claim 2, wherein when the similarity is greater than or equal to the preset value, the quadruped robot returns first information to the server, and the server suspends processing of the video streams for a preset period based on the first information;

when the similarity is less than the preset value, the quadruped robot feeds back second information to the server and transmits the second coordinates corresponding to the target object to the server in real time.

4. The intelligent security method according to claim 3, wherein the server sends a notification message to a mobile terminal based on the second information.

5. The intelligent security method according to claim 1, wherein the server further predicts a movement trajectory of the target object based on the second coordinates to generate a target position of the target object at a next moment and generates fourth coordinates according to the target position;

when both the quadruped robot and the security cameras simultaneously lose the target object, the server transmits the fourth coordinates to the quadruped robot, and the quadruped robot updates the navigation path based on the fourth coordinates and moves accordingly.

6. The intelligent security method according to claim 1, wherein during movement of the quadruped robot, environmental sensors equipped in the quadruped robot detects the surrounding environment in real time, and when an obstacle is detected, the quadruped robot adjusts the navigation path based on position coordinates of the obstacle to avoid the obstacle.

7. The intelligent security method according to claim 1, wherein the quadruped robot is further equipped with a light sensor and a light assistance system, when the light sensor detects that a current ambient brightness is below a first preset value, the light assistance system activates a fill light;

when the light sensor detects that the current ambient brightness exceeds a second preset value, the light assistance system activates a light filter device to cover the surveillance camera.

8. An intelligent security system, comprising a processor and a memory, wherein programs comprising computer-readable instructions are stored in the memory, and the processor is configured to implement the intelligent security method of claim 1 by executing the computer-readable instructions.

9. A non-transitory computer-readable storage medium, comprising a computer program executable by a processor to implement the intelligent security method of claim 1.

* * * * *